United States Patent
Qureshi et al.

(10) Patent No.: US 12,468,693 B2
(45) Date of Patent: Nov. 11, 2025

(54) SUMMARY OF DRILLING AND OPERATION REPORTS BASED ON A USER PROMPT

(71) Applicant: Halliburton Energy Services, Inc., Houston, TX (US)

(72) Inventors: Tabassum J. Qureshi, Houston, TX (US); David M. Phillips, Houston, TX (US); Alberto Ancona, Houston, TX (US); Andreas Sadlier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 28 days.

(21) Appl. No.: 18/538,947

(22) Filed: Dec. 13, 2023

(65) Prior Publication Data

US 2025/0200280 A1  Jun. 19, 2025

(51) Int. Cl.
| | |
|---|---|
| *G06F 16/242* | (2019.01) |
| *G06F 16/28* | (2019.01) |
| *G06F 16/903* | (2019.01) |
| *G06F 16/9535* | (2019.01) |
| *G06F 16/958* | (2019.01) |
| *G06F 40/205* | (2020.01) |

(52) U.S. Cl.
CPC ........ *G06F 16/2425* (2019.01); *G06F 16/283* (2019.01); *G06F 16/903* (2019.01); *G06F 16/9535* (2019.01); *G06F 16/958* (2019.01); *G06F 40/205* (2020.01)

(58) Field of Classification Search
CPC .............. G06F 40/205; G06F 16/2455; G06F 16/2425; G06F 16/283; G06F 16/903; G06F 16/958; G06F 16/9535; G06F 16/9574

USPC ......................................................... 707/608
See application file for complete search history.

(56) References Cited

U.S. PATENT DOCUMENTS

| | | |
|---|---|---|
| 10,430,897 B2 | 10/2019 | Khare et al. |
| 10,891,573 B2 | 1/2021 | Foubert et al. |
| 10,922,493 B1* | 2/2021 | Das ...................... G06F 16/243 |
| 11,341,129 B2 | 5/2022 | Miller et al. |
| 11,403,465 B2 | 8/2022 | Matthews et al. |
| 11,506,052 B1 | 11/2022 | Toronyi et al. |
| 11,689,557 B2 | 6/2023 | Humphrey et al. |
| 11,763,232 B2 | 9/2023 | Foubert et al. |
| 2005/0043890 A1 | 2/2005 | Sanstrom |
| 2008/0059115 A1 | 3/2008 | Wilkinson |
| 2009/0157447 A1* | 6/2009 | Busch ................ G06F 16/2428 |
| | | 705/7.38 |

(Continued)

OTHER PUBLICATIONS

"PCT Application No. PCT/US2023/083940 International Search Report and Written Opinion", Aug. 30, 2024, 11 pages.

*Primary Examiner* — Shahid A Alam
(74) *Attorney, Agent, or Firm* — DeLizio, Peacock, Lewin & Guerra, LLP (57) ABSTRACT

Embodiments of a method, system and machine-readable medium for generating a summary of drilling and operation reports based on a user prompt are disclosed herein. In one embodiment, a method comprises receiving a user prompt that was parsed by a natural language processor; generating a first summary of a plurality of drilling reports for at least one wellbore based on a report repository created from the plurality of drilling reports from at least one wellbore; indicating a sentiment score of the first summary; and generating a final summary based on the first summary and the user prompt.

20 Claims, 4 Drawing Sheets

(56) References Cited

U.S. PATENT DOCUMENTS

| | | |
|---|---|---|
| 2014/0379378 A1 | 12/2014 | Cohen-Solal et al. |
| 2015/0294088 A1 | 10/2015 | Walker et al. |
| 2017/0132299 A1* | 5/2017 | Fox .................... G06F 16/254 |
| 2020/0257420 A1 | 8/2020 | Ramchune |
| 2021/0165963 A1 | 6/2021 | Mendes et al. |
| 2022/0188675 A1 | 6/2022 | Laing et al. |

* cited by examiner

SUMMARY OF DRILLING AND OPERATION REPORTS BASED ON A USER PROMPT

TECHNICAL FIELD

The disclosure generally relates to the field drilling operations for hydrocarbon recovery, and more specifically to drilling report data and managing equipment used in recovering hydrocarbons from subsurface formations based on the drilling report data.

BACKGROUND

Equipment for recovering hydrocarbons from subsurface formations may include piping, valves, fracturing pumps, electric motors, electric generators, and other components. These components may be integrated to perform complex tasks related to recovering hydrocarbons. The equipment may experience high pressures, high temperatures, and other extreme conditions during hydrocarbon recovery. Given the equipment complexity and extreme conditions, equipment operators and production managers may benefit from summary reports that provide data for determining well production and safety. Typical drilling and operations reports may be multiple pages long and contain a large amount of data. Such large reports take a very large time to consume and review. Users may benefit from a summary report that may be created based on a specific query from a user.

BRIEF DESCRIPTION OF THE DRAWINGS

Implementations of the disclosure may be better understood by referencing the accompanying drawings.

DETAILED DESCRIPTION

The description that follows may include example systems, methods, techniques, and program flows that embody implementations of the disclosure. However, this disclosure may be practiced without these specific details. For clarity, some well-known instruction instances, protocols, structures, and techniques may not be shown in detail.

Overview

Drilling Reports and Operation Reports are manually generated every day and stacked within huge databases along with the other oil field operations data. The size of each report can vary from several KiloBytes (kB) to GigaBytes (gB). With a great growing volume of reports each day, implied information such as the daily occurrence of low or medium incidence that could lead to a potentially critical hazard in future operations may often be hidden and/or misinterpreted.

Well construction operations cannot predict trends across multiple disparate daily reports such as disparate reports relating to changes in the bottom hole assembly (BHA), use of a variety of fluids/mud, and their varying pressure and temperature. These disparate reports may not be easily and comprehensively summarized for quick analysis. There may not be a system or method available to quickly and efficiently provide an intelligent summary of daily drilling and operation reports based on a user's requested query. Users may spend many hours scouring through pages of data to find something specific, and/or may miss significant data or information because of the volume of the presently available reports, or depending on the user, the user may not know exactly what to search for in the reports.

Features and implementations disclosed herein provide reports and data that may result in reduced report reading time and summarize significant information to optimize well construction operations and mitigate drilling hazards. An artificial intelligence (AI) based system may generate an intelligent summary of a current or specific day's and/or historical drilling and/or operations report for at least one wellbore of interest. The intelligent summary may aid key field personnel and office-based decision makers to make quick and efficient decisions with regards to the ongoing oil-field operations. The user may enter a prompt to query drilling and operational data for one or more other wellbores which may be related to the wellbore of interest. The system can be fed with the most recent and/or historical reports. Using a Large Language Model (LLM), all reports may undergo pattern and language recognition process to identify distinct report attributes and keywords and store them in a database. A natural language processor (NLP) may process manually entered text within the report and generate responses to user prompts or queries (such as text that indicated information desired by the user). Using prompts, end users can generate a summary of either the entire report(s) or any specific aspect of the reports and perform trend analysis across multiple reports. The user can enter any prompt or query without restrictions or special criteria. The prompt can be as simple or as complex as desired by the user.

The use of LLM in the oil and gas industry to summarize relevant information from multiple static data sources generated at the rig side of a wellbore is a technical improvement in how the collected information can be shared and consumed across multidisciplinary groups. The LLM may have access to all available data for a wellbore and may have data for related or nearby wellbores. No present reports or field implementations have this functionality. The features disclosed herein may speed-up decision making and operational workflows for subsurface operations. The features disclosed herein may also improve the processes of collaboration, information sharing, and operational data correlation that is relevant to improve efficiency and optimize decision making for well operations. Furthermore, features and implementations disclosed herein may be integrated with dynamic data such as real-time data streaming and other data repositories such as the risk databases, standard operational procedures databases, data historians, and financial databases providing a wide set of relevant information to the end user, enhancing their decision-making process.

Some industry advantages and technological improvements may include providing a concise and easy to read summary based on Daily Drilling Reports and Operation Reports, creating efficiencies, and saving user time and resources previously consumed by reading through multiple pages of reports. The ability to create summary reports created according to aspects of the disclosure also assures all data that is accessible to a user, providing better outcomes than might otherwise occur if material report data was missing and not used in the decision-making process.

Using the LLM and NLP, user-generated queries and/or data requests can be quantitively and qualitatively enhanced and the user's ability to summarize, sort, and produce summary reports from multiple locations, wells, and reports sources is possible. Currently, LLM algorithms and keyword searches are not available to query massive amounts of data within reports, but by creating this summary model, a user is empowered and able to manually enter prompts and search for related information over single or multiple wells and/or reports. Operators, end users, and customers are enabled to access well construction reports, and improve and optimize operations. The end user may also be able to modify an operation within the wellbore based on the generated summary, including altering or modifying downhole tool operations.

Aspects disclosed herein provide benefits and novel solutions to reports and report generators currently available and used in the oil and gas industry. In some implementations, a summary generator disclosed herein is not generating reports but is consuming and processing existing reports to provide a summary of the reports based on the user prompt. In some implementations, the summary generator is not identifying events based on drilling reports but may summarize both drilling and operational reports and may detect trends based on the user prompt. The summary generator may also provide a contextual summary of the reports and events for the user. Aspects disclosed herein do not classify drilling reports with deep natural language processing using word vectors but may process drilling reports using LLM and NLP technologies.

Example Environment

Figure 1:
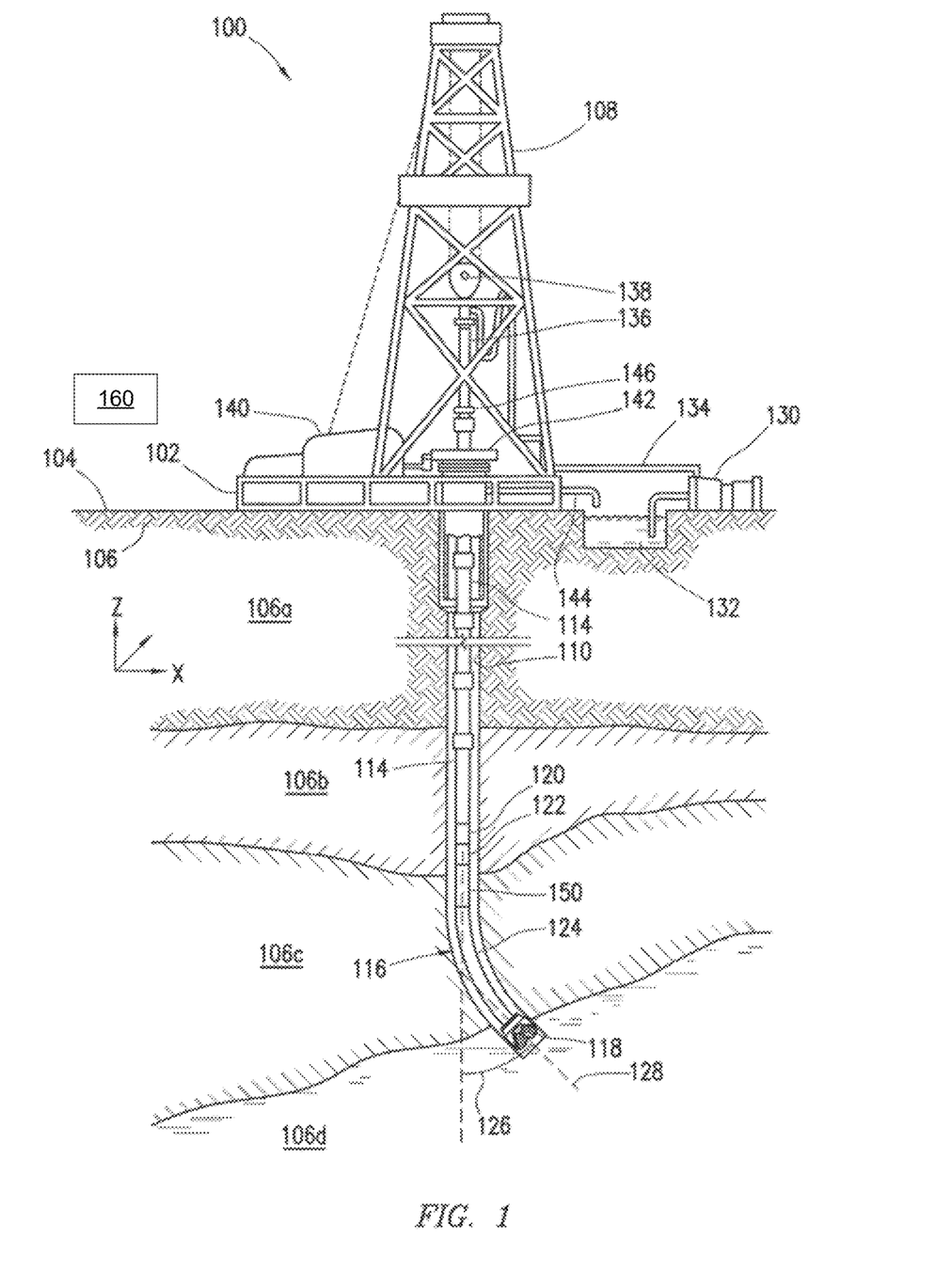
FIG. 1 is a diagram illustrating a well system configured for hydraulically fracturing subsurface formations in one or more wells.

FIG. 1 is a perspective view of a wellbore system. In FIG. 1, a wellbore system 100 comprises a drilling platform 102 positioned at the surface 104. In the embodiment shown, the surface 104 comprises the top of a formation 106 containing one or more rock strata or layers 106 a-d, and the drilling platform 102 may be in contact with the surface 104. In other embodiments, such as in an offshore drilling operation, the surface 104 may be separated from the drilling platform 102 by a volume of water.

The wellbore system 100 comprises a derrick 108 supported by the drilling platform 102 and having a traveling block 138 for raising and lowering a drill string 114. A kelly 136 may support the drill string 114 as it is lowered through a rotary table 142 into a borehole 110. A pump 130 may circulate drilling fluid through a feed pipe 134 to kelly 136, downhole through the interior of drill string 114, through orifices in a drill bit 118, back to the surface via an annulus 140 formed by the drill string 114 and the wall of the borehole 110. Once at the surface, the drilling fluid may exit the annulus 140 through a pipe 144 and into a retention pit 132. The drilling fluid transports cuttings from the borehole 110 into the pit 132 and aids in maintaining integrity or the borehole 110.

The wellbore system 100 may comprise a bottom hole assembly (BHA) 116 coupled to the drill string 114 near the drill bit 118. The BHA 116 may comprise a logging while drilling (LWD)/Measuring while drilling (MWD) tool 122 and a telemetry element 120. The LWD/MWD tool 122 may include receivers and/or transmitters (e.g., antennas capable of receiving and/or transmitting one or more electromagnetic signals). As the borehole 110 is extended by drilling through the formations 106, the LWD/MWD tool 122 may collect measurements relating to various formation properties as well as the tool orientation and position and various other drilling conditions, including formation resistivity, a gamma ray device for measuring formation gamma ray intensity, devices for measuring the inclination and azimuth of the drill string 114, pressure sensors for measuring, e.g., drilling fluid pressure, temperature sensors for measuring borehole temperature, etc. The telemetry element 120 may be coupled to other elements within the BHA 116, e.g., the LWD/MWD tool 122, and may transmit data to and receive data from a control unit or processor 160 located at the surface via a surface transceiver 146, the data corresponding or directed to one or more of the elements within the BHA 116. The control unit 160 may collect a plurality of drilling data from the wellbore system 100 and may also be communicatively coupled with other nearby or related wellbores for collection and correlation of additional data. The control unit 160 may also be coupled with or include a database, such as an LLM. The control unit 160 may also include or be coupled with one or more microprocessors. The microprocessors may be coupled with computer-readable instructions for a natural language processor (NLP) configured for generating one or more summary reports based on a user's prompt. The processors may include a summary generator and a plurality of independent report generators that generate reports about particular components or aspects of the system. The report generators may reside on any suitable computer system communicatively coupled with control unit 160 or otherwise included in the wellbore system 100.

The telemetry element 120 may transmit measurements or data through one or more wired or wireless communications channels (e.g., wired pipe or electromagnetic propagation). Alternatively, the telemetry element 120 may transmit data as a series of pressure pulses or modulations within a flow of drilling fluid (e.g., mud-pulse or mud-siren telemetry), or as a series of acoustic pulses that propagate to the surface through a medium, such as the drill string 114. In other embodiments, wired drill pipe, acoustic telemetry, or other telemetry technologies known in the art may be used to provide communication between the surface control unit and the telemetry element 120.

In certain embodiments, the wellbore system 100 may further comprise a downhole directional drilling system, such as a rotary steerable system (RSS) tool 150 that can control and steer direction of the downhole tool. The RSS 150 may include at least a motor and be coupled with a drilling sub 124 and the drill bit 118. In the embodiment shown, the RSS 150 and the drilling sub 124 are positioned within the BHA 116 closest to the drill bit 18. In other embodiments, the RSS 150 and the drilling sub 124 may be located in other areas along the drill string 114, including above the LWD/MWD tool 122 and telemetry element 120 in the BHA 116, and coupled to the drill string 114 above the BHA 116. The RSS 150 may rotate the drill bit 118, causing it to extend the BHA 116. The drilling sub 124 may control, in part, the longitudinal axis 128 of the drill bit 118 with respect to the longitudinal axis 126 of the wellbore system 100 above the drilling sub 124.

Figure 2:
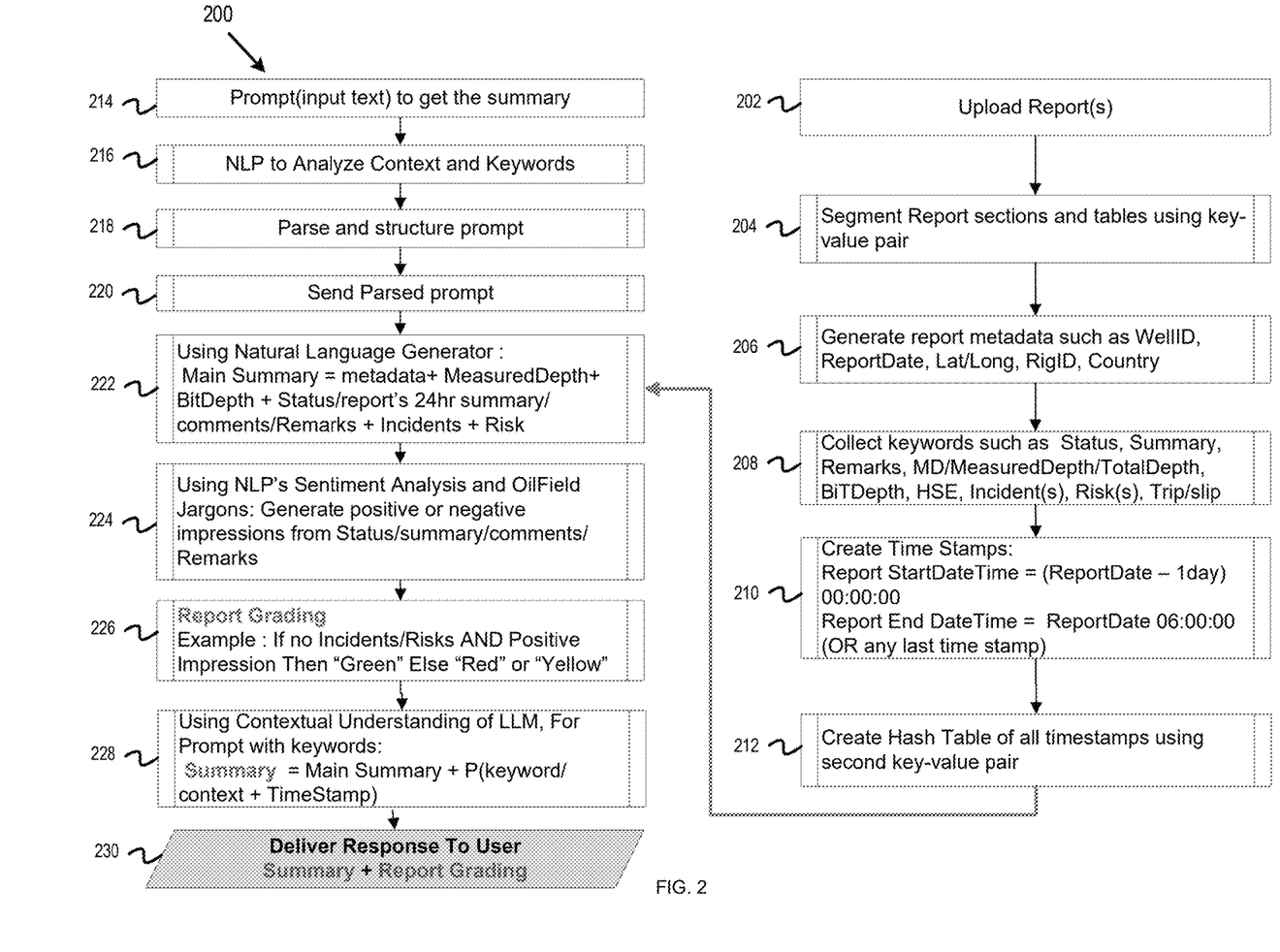
FIG. 2 is a flow diagram illustrating one embodiment of a method, according to some embodiments.

FIG. 2 is a flow diagram illustrating operations for a method of summarizing well-related reports according to some embodiments. There are two process flows in the method 200. In one process flow, an LLM processes data from one or more reports. In another process flow, an NLP generates a summary report based on a user prompt and data from the LLM based model.

The LLM based process flow begins at block 202 where the LLM may obtain and upload a plurality of reports from one or more wellbores. These reports may include daily drilling reports, operational reports, mud reports, logging reports and other reports which may be collected during drilling of a wellbore and production of a wellbore completion over a period of time, such as daily or other number of fixed hours. Each report may include a plurality of sections and tables included therein.

At a block 204, the LLM may segment each report's sections and tables using key-value pairs to create unique elements that may be stored within a report repository.

At block 206, the LLM may generate report metadata to uniquely identify each report. The metadata may include data such as Well ID identification information, Report Date, latitude and longitude of drilling location, Rig ID, and location of the wellbore, and other data which may be used to uniquely identify or provide context to each report.

At a block 208, the LLM may create a collection of tokenized keywords from the reports. For example, the keywords may include Status, Summary, Remarks, Measured Depth, Total Depth, a ratio of measured depth to total depth (Measured Depth/Total Depth), Bit Depth, Health Safety and Environmental (HSE) data such as incidents, risks, trip/slip, and/or any other keywords from a report that may be used to filter and summarize the report based on a user prompt's keyword.

At a block 210, the LLM may collect a series of events. The events may be timestamps and include the following:
a. Report Start Date Time=(ReportDate−1 day) 00:00:00
b. Report End DateTime=ReportDate 06:00:00 (OR any last time stamp)

At a block 212, the LLM may generate a Hash Table of all TimeStamps using key-value pairs. The report segments, metadata, keywords, timestamps, and hash table may be stored in the report repository. The report repository may be available to a Natural Language Generator for use in preparing a first summary of the plurality of reports.

At block 214, an NLP may receive a user prompt. The user prompt can be anything the user is looking for in plain or natural language (examples provided herein with reference to FIG. 3). At block 216 the NLP may analyze the user prompt for context and keywords. At block 218, the NLP may parse the user prompt and structures an input text. At block 220, the parsed prompt may be sent to the summary generator.

At block 222 a Natural Language Generator (NLG) generates the first summary of reports using reports repository items. The first summary may also be called the "Main Summary." In some embodiments, the Main Summary is based on: metadata+MeasuredDepth+BitDepth+Status/report's 24 hr summary/comments/Remarks+Incidents+Risk". In some embodiments, the Main Summary may be based on one or more permutations or combinations of metadata, MeasuredDepth, BitDepth, Status, 24 hr summary, comments, Remarks, Incidents, and Risk.

At block 224, the summary generator may use a sentiment analysis algorithm along with oil field jargons or lexicons, such as stuck pipe, influx, kick, dogleg, doghouse, Kelly, ROP, hole condition, etc to generate a sentiment score of the first summary and positive or negative impressions. The NLG may generate the sentiment score by analyzing the first summary based on the oilfield lexicons, status identifiers, ranges, and remarks included in the first summary from the LLM. Sentiment analysis identifies the mood of a block of the report text as positive, negative, or neutral. The overall sentiment of the report is a net polarity score of all analyzed text blocks, net positive score is overall positive impression, etc.

At block 226, a report grade may be determined. The grade may be positive, critical, or cautionary. The report grade is a combination of the sentiment score and occurrence of non-productive time (NPT) incidents. For example, positive net score and zero incidents is green; net positive score and zero incidents, or, net negative score and zero incidents is yellow; negative net score and one or more incidents is red.

At block 228, the LLM may apply a Contextual Understanding algorithm to the user prompt and keywords (from the LLM, block 208) to generate a final summary for the user based on the initial user prompt. The final summary combines the first summary ("Main Summary" generated at block 222) and the probability of number of occurrences of prompt's keywords/context along with the event time stamps are created, integrated, and purged At block 230, the summary generator may provide the final summary to the user along with a report grade.

As the method 200 goes through several iterations, the LLM may continually learn or be retrained to refine the data processing that occurs in blocks 204 through 212 and optimize the output provided to the report repository.

In some embodiments of the method 200, the LLM may be connected with other data sources like risk databases, standard operational procedures databases and/or drilling reports historian databases in order to include additional information with the first summary from the drilling and operations report. Providing additional data sources may enhance the data gathering and information correlation for a more extensive analysis by the end user. The summary generator may, in some embodiments, include an AI based automated functionality to obtain relevant data where the relevant data may optimize these time-consuming tasks and optimize productivity. In these embodiments, the LLM may continually learn and retrain itself to improve the report repository. Therefore, the summary generator may continually provide better report summaries over time.

In other alternative embodiments, the first summary of the drilling and operations report from the LLM may evolve to an automated advisory system that gathers, correlates and compares dynamic and static information to provide predictive analysis based on present conditions of the well construction lifecycle. The summary generator may therefore evolve into an advisory system that summarizes and contextualizes the information presented to the end user.

Figure 3:
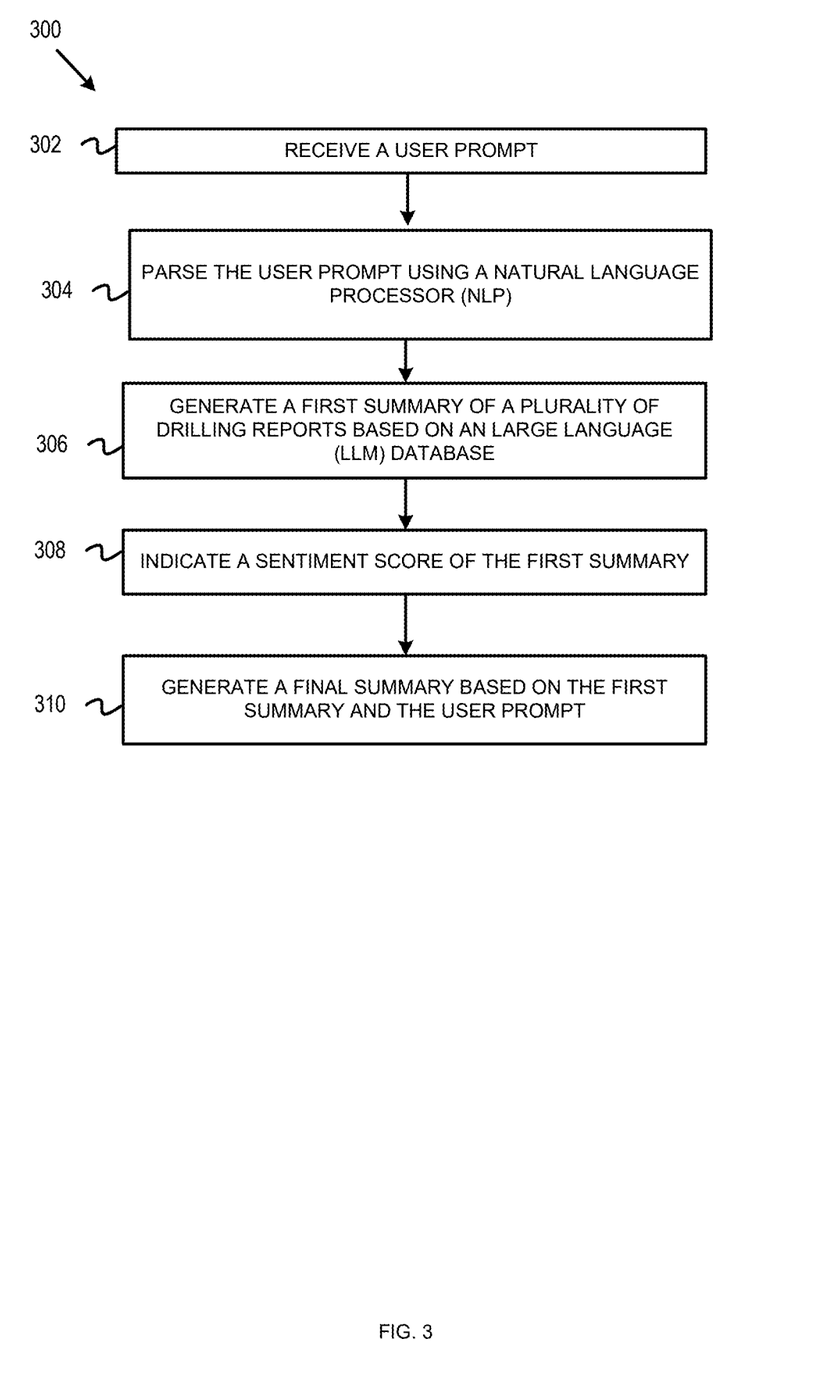
FIG. 3 is a flow diagram illustrating another embodiment of a method, according to some embodiments.

FIG. 3 is a flow diagram illustrating operations for a method for summarizing reports based on a user prompt. At block 302, a summary generator may receive a user prompt related to one or more wellbores. The user prompt may be in natural/plain language. Examples of a user prompt may include a general query such as "Summarize today's report," to a more specific query such as "Show me all the Drilling reports where a tool was used and ROP was greater than 300 ft/hr." Other examples include: "Give me 24 hr summary of last 5 drilling reports from Well XXX-001," "Summarize incidents and hazards from today's Drilling and Ops reports of the Well XYX-005," and "Provide all events occurred at 3000 m from the Field-ZZZ or Block-XYZ."

At block 304, an NLP may parse the user prompt.

At block 306, the summary generator may generate, using a natural language generator (NLG), a first summary of a plurality of drilling reports based on a large language model (LLM) database created from the plurality of drilling reports. The reports may include any suitable report related to any suitable aspect of the wellbore system 100. In some embodiments, the drilling reports may be daily drilling reports, operational reports, mud reports, logging reports and other reports collected during drilling of a wellbore or during operation of a wellbore completion.

At block 308, the summary generator may analyze the first summary and indicate a sentiment score of the first summary. Indicating the sentiment score may include generating a positive or negative impression of the first summary, and may also include a status, summary, comments, and/or remarks.

At block 310, the summary generator may generate a final summary for the user, based on the first summary and the user prompt. The report may include additional information for the user, including a grade of the report, which may tell the user, for example, whether conditions of the wellbore are "good/safe," whether attention or caution is needed, or whether a critical condition is present requiring immediate or imminent action. The user may modify one or more downhole operations based on information provided in the final summary. For example, if the final summary indicates conditions in the wellbore need attention or are critical, adjustments may be made to the operation of drilling tools to stop/pause or adjust the drilling operation.

Example Computer

Figure 4:
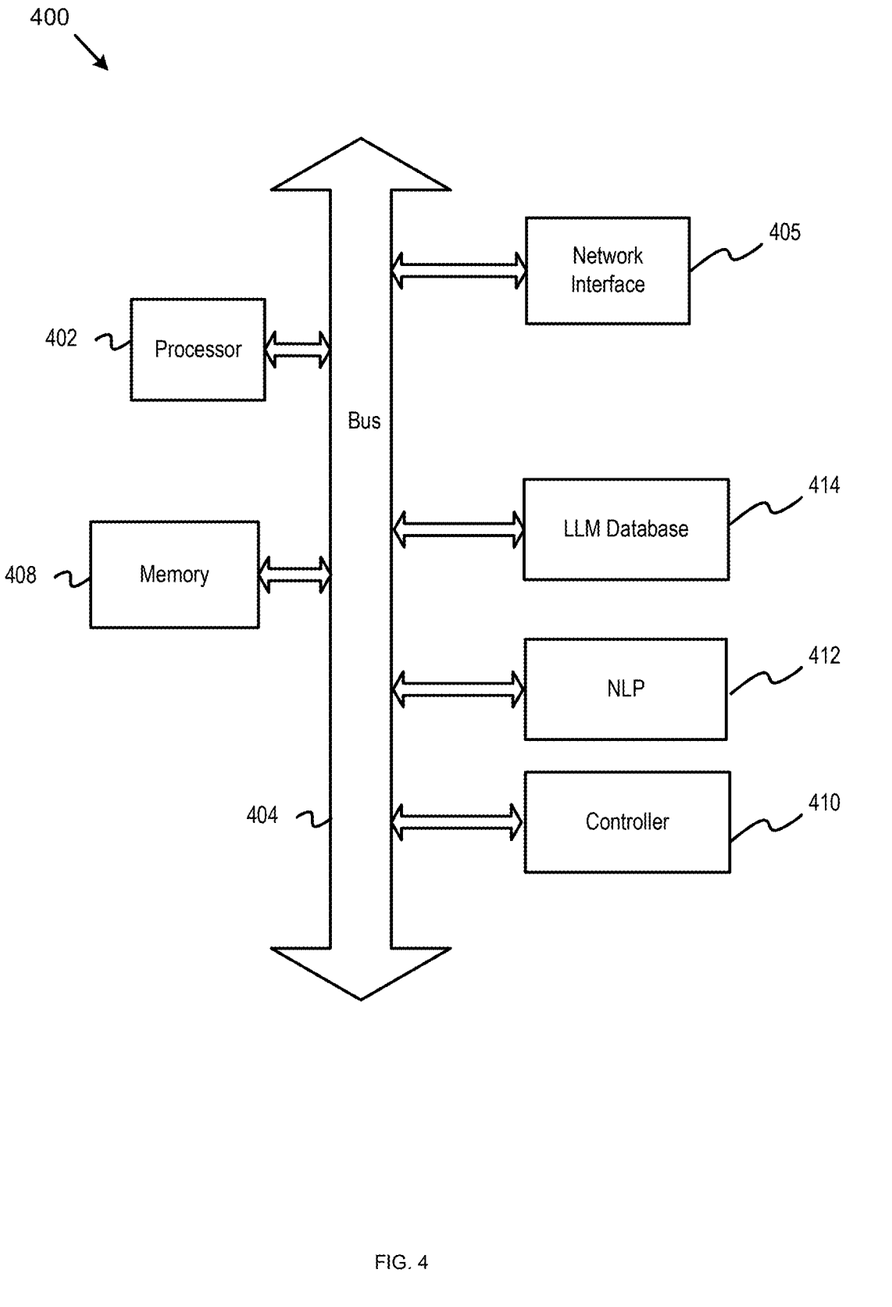
FIG. 4 is a block diagram illustrating an example computer system that may be utilized with some implementations.

FIG. 4 is a block diagram illustrating a computer system that may be utilized with some implementations. A computer system 400 may include one or more processors 402 connected to a system bus 404. The system bus 404 may be connected to memory 408 and a network interface 405. The memory 408 may include any suitable memory random access memory (RAM), non-volatile memory (e.g., magnetic memory device), and/or any device for storing information and instructions executable by the processor(s) 402. The network interface 405 may provide connectivity to any suitable network, such as a wired network, wireless network, satellite network, etc.

The computer system 400 may include additional peripheral devices. For example, the computer system 400 may include multiple external multiple processors. In some implementations, any of the components can be integrated or subdivided.

The computer system 400 also may include a controller 410. The controller 410 may perform one or more operations depicted in FIG. 4. Any one of the previously described functionalities may be partially (or entirely) implemented in hardware and/or on the processor 402. For example, the functionality may be implemented with an application specific integrated circuit, in logic implemented in the processor 402, in a co-processor on a peripheral device or card, etc. Further, realizations may include fewer or additional components not illustrated in FIG. 4 (e.g., video cards, audio cards, additional network interfaces, peripheral devices, etc.). The processor 402 and the network interface 405 are coupled to the bus 404. Although illustrated as being coupled to the bus 404, the memory 408 may be coupled to the processor 402.

The computer system 400 may also include an NLP 412 and an LLM database 414 which may be connect with at least the one or more processors 402 for performing the functions as described above in FIGS. 2 and 3. Components of the computer system 400 may include components or program instructions that implement operations for a wellbore system, such as shown in FIG. 1. For example, the controller 410 may include the control unit 160 and may include program instructions that implement simulations of commands and states of the wellbore system 100. In some implementations, the computer system 400 may be included in the wellbore system 100 and may cooperate with controllers and other components to perform the functionality described herein.

Any component of the computer system 400 can be implemented as hardware, firmware, and/or machine-readable media including computer-executable instructions for performing the operations described herein. For example, some implementations include one or more non-transitory machine-readable media including computer-executable instructions including program code configured to perform functionality described herein. Machine-readable media includes any mechanism that provides (e.g., stores and/or transmits) information in a form readable by a machine (e.g., a computer system). For example, tangible machine-readable media includes read only memory (ROM), random access memory (RAM), magnetic disk storage media, optical storage media, flash memory machines, etc. Machine-readable media also includes any media suitable for transmitting software over a network.

FIGS. 1-4 and the operations described herein are examples meant to aid in understanding example implementations and should not be used to limit the potential implementations or limit the scope of the claims. None of the implementations described herein may be performed exclusively in the human mind nor exclusively using pencil and paper. None of the implementations described herein may be performed without computerized components such as those described herein. Some implementations may perform additional operations, fewer operations, operations in parallel or in a different order, and some operations differently.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that may be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

EXAMPLE EMBODIMENTS

Aspects disclosed herein include the following:

Aspect A: A method comprising: receiving a user prompt that was parsed by a natural language processor; generating a first summary of a plurality of drilling reports for at least one wellbore based on a report repository created from the plurality of drilling reports from at least one wellbore; indicating a sentiment score of the first summary; and generating a final summary based on the first summary and the user prompt.

Aspect B: A system comprising: a large language model (LLM) configured to generate a database created from a plurality of drilling reports from at least one wellbore; a summary generator configured to: receive a user prompt that was parsed by a natural language processor; generate a first summary of the plurality of drilling reports based on the database created from the plurality of drilling reports; indicate a sentiment score of the first summary; and generate a final summary based on the first summary and the user prompt.

Aspect C: One or more machine-readable mediums including instructions executable by one or more processors, the instructions comprising: instructions to receive a user prompt that was parsed by a natural language processor; instructions to generate a first summary of a plurality of drilling reports based on a report repository created from the plurality of drilling reports from at least one wellbore; instructions to indicate a sentiment score of the first summary; and instructions to generate a final summary based on the first summary and the user prompt.

Aspects A, B, and C may have one or more of the following additional elements in combination:

Element 1: further comprising obtaining, by a large language model (LLM), the plurality of drilling reports, wherein each report includes sections and tables; segmenting, by the LLM, the sections and tables using first key-value pairs; generating, by the LLM, metadata for the plurality of drilling reports; collecting, by the LLM, keywords for the plurality of drilling reports; generating, by the LLM, timestamps; and creating, by the LLM, a hash table of the timestamps using second key-value pairs.

Element 2: wherein the metadata includes Well ID identification information, Report Date, latitude and longitude of drilling location, Rig ID, and location of the wellbore.

Element 3: wherein the keywords are tokenized keywords which include Status, Summary, Remarks, Measured Depth, Total Depth, a ratio of measured depth to total depth (Measured Depth/Total Depth), Bit Depth, Health Safety and Environmental (HSE) data.

Element 4: wherein the timestamps include report start date time, and report end date time.

Element 5: determining the sentiment of the first summary by analyzing the first summary based on oilfield lexicons, status identifiers included in the first summary, and ranges included in the first summary.

Element 6: wherein the final summary includes one of a plurality of report grades and wherein a plurality of colors indicate whether the grade is positive, critical, or cautionary.

Element 7: wherein positive is indicated by green, critical is indicated by red, and cautionary is indicated by yellow.

Element 8: further comprising modifying a downhole operation in the at least one wellbore based on the final summary.

Element 9: wherein the metadata includes Well ID identification information, Report Date, latitude and longitude of drilling location, Rig ID, and location of the wellbore; wherein the keywords are tokenized keywords which include Status, Summary, Remarks, Measured Depth, Total Depth, a ratio of measured depth to total depth (Measured Depth/Total Depth), Bit Depth, Health Safety and Environmental (HSE) data; and wherein the timestamps include report start date time, and report end date time.

Element 10: instructions to determine the sentiment of the first summary by analyzing the first summary based on oilfield lexicons, status identifiers included in the first summary, and ranges included in the first summary; and wherein the final summary includes one of a plurality of report grades and wherein a plurality of colors indicate whether the grade is positive, critical, or cautionary.

What is claimed is:

1. A method comprising:
   receiving a user prompt that was parsed by a natural language processor;
   obtaining, by a trained large language model (LLM), a plurality of drilling reports;
   generating, by the trained LLM, a database created from a plurality of drilling reports from at least one wellbore, wherein each report includes sections and tables, wherein the trained LLM retrains itself after generating the database;
   generating a first summary of a plurality of drilling reports for at least one wellbore based on the database created by the trained LLM from the plurality of drilling reports;
   indicating a sentiment score of the first summary; and
   generating a final summary based on the first summary and the user prompt.

2. The method of claim 1, wherein generating, by the trained LLM, a database includes:
   segmenting, by the LLM, the sections and tables using first key-value pairs;
   generating, by the LLM, metadata for the plurality of drilling reports;
   collecting, by the LLM, keywords for the plurality of drilling reports;
   generating, by the LLM, timestamps; and
   creating, by the LLM, a hash table of the timestamps using second key-value pairs.

3. The method of claim 2, wherein the metadata includes Well ID identification information, Report Date, latitude and longitude of drilling location, Rig ID, and location of the wellbore.

4. The method of claim 2, wherein the keywords are tokenized keywords which include Status, Summary, Remarks, Measured Depth, Total Depth, a ratio of measured depth to total depth (Measured Depth/Total Depth), Bit Depth, Health Safety and Environmental (HSE) data.

5. The method of claim 2, wherein the timestamps include report start date time, and report end date time.

6. The method of claim 1 further comprising:
   determining the sentiment score of the first summary by analyzing the first summary based on oilfield lexicons, status identifiers included in the first summary, and ranges included in the first summary.

7. The method of claim 1, wherein the final summary includes one of a plurality of report grades and wherein a plurality of colors indicate whether the grade is positive, critical, or cautionary.

8. The method of claim 7, wherein positive is indicated by green, critical is indicated by red, and cautionary is indicated by yellow.

9. The method of claim 1, further comprising modifying a downhole drilling operation in the at least one wellbore based on the final summary.

10. A system comprising:
    a trained large language model (LLM) configured to generate a database created from a plurality of drilling reports from at least one wellbore, wherein each report includes sections and tables, and wherein the trained LLM retrains itself after generating the database; and
    a summary generator configured to:
      receive a user prompt that was parsed by a natural language processor;
      generate a first summary of the plurality of drilling reports based on the database created by the trained LLM from the plurality of drilling reports;
      indicate a sentiment score of the first summary; and
      generate a final summary based on the first summary and the user prompt.

11. The system of claim 10, wherein the trained LLM to generate the database is configured to:
    obtain the plurality of drilling reports;
    segment the sections and tables using first key-value pairs;
    generate metadata for the plurality of drilling reports;
    collect keywords for the plurality of drilling reports;
    generate timestamps; and
    create a hash table of the timestamps using second key-value pairs.

12. The system of claim 11, wherein the metadata includes Well ID identification information, Report Date, latitude and longitude of drilling location, Rig ID, and location of the wellbore.

13. The system of claim 11, wherein the keywords are tokenized keywords which include Status, Summary, Remarks, Measured Depth, Total Depth, a ratio of measured depth to total depth (Measured Depth/Total Depth), Bit Depth, Health Safety and Environmental (HSE) data.

14. The system of claim 11, wherein the timestamps include report start date time, and report end date time.

15. The system of claim 10, wherein the summary generator is further configured to:
    determine the sentiment score of the first summary by analyzing the first summary based on oilfield lexicons, status identifiers included in the first summary, and ranges included in the first summary.

16. The system of claim 10, wherein the final summary includes one of a plurality of report grades and wherein a plurality of colors indicate whether the grade is positive, critical, or cautionary.

17. One or more machine-readable mediums including instructions executable by one or more processors, the instructions comprising:

instructions to receive a user prompt that was parsed by a natural language processor;

instructions to obtain, by a trained large language model (LLM), a plurality of drilling reports;

instructions to generate, by the trained LLM, a database created from a plurality of drilling reports from at least one wellbore, wherein each report includes sections and tables, wherein the trained LLM retrains itself after generating the database;

instructions to generate a first summary of a plurality of drilling reports based on the database created by the trained LLM from the plurality of drilling reports from at least one wellbore;

instructions to indicate a sentiment score of the first summary; and instructions to generate a final summary based on the first summary and the user prompt.

18. The one or more machine-readable mediums of claim 17, wherein the instructions to generate, by the trained LLM, a database include:

instructions to obtain, by a large language model (LLM), the plurality of drilling reports;

instructions to segment, by the LLM, the sections and tables using first key-value pairs;

instructions to generate, by the LLM, metadata for the plurality of drilling reports;

instructions to collect, by the LLM, keywords for the plurality of drilling reports;

instructions to generate, by the LLM, timestamps; and instructions to create, by the LLM, a hash table of the timestamps using second key-value pairs.

19. The one or more machine-readable mediums of claim 18, wherein the metadata includes Well ID identification information, Report Date, latitude and longitude of drilling location, Rig ID, and location of the wellbore;

wherein the keywords are tokenized keywords which include Status, Summary, Remarks, Measured Depth, Total Depth, a ratio of measured depth to total depth (Measured Depth/Total Depth), Bit Depth, Health Safety and Environmental (HSE) data; and wherein the timestamps include report start date time, and report end date time.

20. The one or more machine-readable mediums of claim 17, further comprising:

instructions to determine the sentiment score of the first summary by analyzing the first summary based on oilfield lexicons, status identifiers included in the first summary, and ranges included in the first summary; and wherein the final summary includes one of a plurality of report grades and wherein a plurality of colors indicate whether the grade is positive, critical, or cautionary.

* * * * *